United States Patent
Skaggs et al.

(10) Patent No.: US 8,669,455 B2
(45) Date of Patent: Mar. 11, 2014

(54) EDUCATIONAL METHOD AND APPARATUS TO SIMULTANEOUSLY TEACH READING AND COMPOSING MUSIC

(75) Inventors: Merrie L. Skaggs, Baldwin, KS (US); Nancy C. Funkhouser, Baldwin, KS (US)

(73) Assignee: Merrienan Melodies, LLC, Baldwin City, KS (US)

( * ) Notice: Subject to any disclaimer, the term of this patent is extended or adjusted under 35 U.S.C. 154(b) by 0 days.

(21) Appl. No.: 13/240,826

(22) Filed: Sep. 22, 2011

(65) Prior Publication Data

US 2012/0067195 A1  Mar. 22, 2012

Related U.S. Application Data

(60) Provisional application No. 61/385,454, filed on Sep. 22, 2010.

(51) Int. Cl.
*G09B 15/00* (2006.01)
*G09B 15/02* (2006.01)
*G10H 1/00* (2006.01)

(52) U.S. Cl.
USPC ........ 84/477 R; 84/470 R; 84/471 R; 84/475; 84/483.2

(58) Field of Classification Search
None
See application file for complete search history.

(56) References Cited

U.S. PATENT DOCUMENTS

| | | | | |
|---|---|---|---|---|
| 5,646,648 A * | 7/1997 | Bertram | | 345/168 |
| 7,629,527 B2 * | 12/2009 | Hiner et al. | | 84/470 R |
| 7,745,713 B2 * | 6/2010 | Fukada et al. | | 84/600 |
| 7,767,895 B2 * | 8/2010 | Johnston | | 84/483.2 |
| 7,767,900 B2 * | 8/2010 | Abe et al. | | 84/645 |
| 7,982,115 B2 * | 7/2011 | Johnston | | 84/483.2 |
| 2002/0117043 A1 * | 8/2002 | Powley | | 84/483.2 |
| 2003/0167902 A1 * | 9/2003 | Hiner et al. | | 84/477 R |
| 2005/0056144 A1 * | 3/2005 | Yang et al. | | 84/719 |
| 2006/0150803 A1 * | 7/2006 | Taub | | 84/616 |
| 2007/0022865 A1 * | 2/2007 | Nishibori et al. | | 84/609 |
| 2007/0044639 A1 * | 3/2007 | Farbood et al. | | 84/609 |
| 2007/0214947 A1 * | 9/2007 | Nishibori et al. | | 84/744 |
| 2007/0221043 A1 * | 9/2007 | Hao | | 84/477 R |
| 2010/0251875 A1 * | 10/2010 | Johnston | | 84/483.2 |
| 2011/0100198 A1 * | 5/2011 | Gatzsche et al. | | 84/615 |
| 2011/0192270 A1 * | 8/2011 | Saxby | | 84/483.2 |
| 2011/0259178 A1 * | 10/2011 | Hiner et al. | | 84/477 R |
| 2012/0067195 A1 * | 3/2012 | Skaggs et al. | | 84/477 R |

* cited by examiner

*Primary Examiner* — Marlon Fletcher
(74) *Attorney, Agent, or Firm* — Dentons US LLP; Adam C. Rehm

(57) ABSTRACT

A method and apparatus for composing and teaching of music while learning to read music is provided that involves a user following a supported sequence of tasks that guide creativity of the user to construct a musical composition. The musical composition is constructed by assigning alphabetical characters to colors and musical notes to form a chart, forming words and phrases using the alphabetical characters, and cross-referencing the words and phrases to the chart. Various interactive components and computer software facilitate use of the method and process.

16 Claims, 5 Drawing Sheets

EDUCATIONAL METHOD AND APPARATUS TO SIMULTANEOUSLY TEACH READING AND COMPOSING MUSIC

CROSS-REFERENCE TO RELATED APPLICATION

This Patent Application claims priority to U.S. patent application Ser. No. 61/385,454 filed Sep. 22, 2010, the entire contents of which is incorporated herein by reference in its entirety.

BACKGROUND OF THE INVENTION

1. Field of the Invention

The present general inventive concept relates generally to teaching methods and apparatuses, and more particularly to an educational method that utilizes a plurality of apparatuses to simultaneously teach reading and composing music.

2. Description of the Related Art

Traditional methods for learning how to read musical and literary compositions involve a significant amount of memorization and repetition. Learning how to read music generally requires memorization of notes and their proper location on the Bass and Treble staffs accompanied by hours of repetition with a particular instrument. Learning how to read literary works generally requires memorization of characters, their shapes, and relates sounds when combined in an arrangement accompanied by hours of repetition.

Numerous conventional systems and methods have attempted to improve on teaching of musical and literary reading, but generally fail to provide an interactive system and method that works effectively and efficiently with beginners, and particularly young children who have not yet learned to read basic literary works. Some conventional systems attempt to facilitate learning music by providing various aids, for instance, mnemonic aids to convey the manner in which musical notes are arranged such as "every good boy does fine" and "FACE," however, significant memorization and repetition are still required to make use of such aids. Other aids include adding written indicia to, for instance, a piano keyboard, to indicate where on the piano keyboard fingers of a student should placed. The written indicia, however, does not provide a nexus between the piano keyboard and musical notes. Thus, when the written indicia is removed from the piano keyboard, the student is no longer able to read notes because the student erroneously associates the finger indicia with the note.

Examples of some conventional systems and methods include the following patent references, which are incorporated by reference herein in their entireties.

U.S. Pat. No. 7,705,229 issued Apr. 7, 2010 is directed to providing a student with a sequence of tasks using building blocks that allow the student to construct a musical arrangement, but is overly complex and not ideal for younger students, especially students who have not yet learned how to read basic literary works.

U.S. Pat. No. 7,629,527 issued Dec. 8, 2009 is directed to a system that provides a student with a modified, interactive representation of a musical score with an interactive component for feedback, but requires extensive memorization and additional components that increase the costs of utilizing the system.

U.S. Pat. No. 1,400,947 issued Dec. 20, 1921 is directed to an indicator for musical instruction that associates musical notes on staffs with keys on a keyboard and provides an audible buzzer when the correct association is made by a student, but does not teach the student how to compose music.

Accordingly, there is a need for a method for teaching and learning music that does not suffer from the limitations of conventional music learning methods, is versatile for use by a wide variety of students of varying degrees of education and ability, and is efficient, easy, and economical to use.

SUMMARY OF THE INVENTION

The following brief description is provided to indicate the nature of the subject matter disclosed herein. While certain aspects of the present inventive concept are described below, the summary is not intended to limit the scope of the present inventive concept. Embodiments of the present inventive concept provide a method for teaching music. The present inventive concept does not suffer from and remedies the deficiencies of conventional methods and devices such as those previously set forth herein.

The present inventive concept provides, in its simplest form, a method that utilizes a plurality of apparatuses to simultaneously teach reading and composing musical notes and alphabetical characters using various interactive apparatuses to display and receive input from a student. One or more of the interactive apparatuses are operable to display of a chart with alphabetical characters assigned to both colors and musical notes. One or more of the interactive apparatuses arranges the alphabetical characters or accepts input of alphabetical characters arranged by the user to form words and/or phrases. One or more of the interactive apparatuses or the student utilizes the chart to cross-reference each one of the alphabetical characters to identify an assigned color and/or musical note. Each one of the identified colors and/or musical notes are then arranged to form a musical composition via one or more of the interactive apparatuses or the student. In this manner, the method and apparatuses of the present inventive concept enables a student to compose music while simultaneously learning to read literary compositions.

It is an object of the present inventive concept to provide a method that teaches music reading skills to students in view of inherent and personal interest. This method teaches the student to write as well as read music. This method also teaches a student to compose their own melodies, rather than merely require the student to play music that someone else has written.

The aforementioned may be achieved by the present inventive concept in an aspect thereof by providing a method for composing a musical composition, the method comprising the steps of (a) providing a computer interface device adapted for (i) alphabetical character input, (ii) color input, and (iii) musical note input, and connecting said device to a computer programmed to recognize the (i) alphabetical character input, (ii) color input, and (iii) musical note input, (b) displaying at least one word having a plurality of alphabetical characters via a monitor connected to the computer, (c) displaying a plurality of colors via the monitor connected to the computer, (d) displaying a plurality of musical notes via the monitor connected to the computer, (e) enabling assignment of each one of the plurality of colors to each one of the plurality of alphabetical characters via one of the computer interface device and automatically via the computer, (f) enabling assignment of each one of the plurality of musical notes to each one of the plurality of colors to form a musical composition via the computer interface device, and/or (g) displaying the musical composition to enable playback thereof.

The displayed music composition means may be a music staff. The displayed music staff may include (i) a clef, (ii) a set of five horizontal lines, and/or (iii) four spaces therebetween, the four spaces may each be operable to receive the input of at least a portion of the musical composition. The at least one word may be a plurality of predetermined words that form a phrase. The plurality of predetermined words may be stored in a database and/or memory of the computer.

The method may further include the step of enabling input of the plurality of alphabetical characters to form the at least one word via the interface means.

The aforementioned may also be achieved by the present inventive concept in another aspect by providing a method for composing a musical composition, the method comprising the steps of (a) providing a computer interface device adapted for (i) alphabetical character input, (ii) color input, and (iii) musical note input, and connecting said device to a computer programmed to recognize the (i) alphabetical character input, (ii) color input, and (iii) musical note input, (b) displaying a plurality of words via a monitor connected to the computer, each of the plurality of words having a plurality of alphabetical characters, (c) displaying a plurality of colors via the monitor connected to the computer, (d) displaying a plurality of musical notes via the monitor connected to the computer, (e) enabling selection of at least one of the plurality of words via the computer interface device, (f) assigning each one of the plurality of colors to each one of the plurality of alphabetical characters via the computer, (g) assigning each one of the plurality of musical notes to each one of the plurality of colors to form a musical composition via the computer, and/or (h) playing back the musical composition via a speaker connected to the computer.

The plurality of words may be predetermined words stored in a database and/or memory of the computer. The method may further include the steps of enabling input of a name of the user via the computer interface device and/or storing the name of the user in a database of the computer. The method may further include the steps of displaying an interactive selection device, allowing a user to activate the interactive selection device, and/or displaying a result of the activated interactive selection device. The result may be a song to be played by the user.

The aforementioned may also be achieved by the present inventive concept in another aspect by providing a method for composing a musical composition, the method comprising the steps of (a) displaying at least one word having a plurality of alphabetical characters via a visual-display means, (b) displaying a plurality of colors via the visual-display means, (c) displaying a plurality of musical notes via the visual-display means, (d) assigning each one of the plurality of plurality of alphabetical characters to (i) each one of the plurality of colors, and (i) each of the plurality of musical notes, (e) displaying the assignments on a chart via the visual-display means, (f) displaying a music composition means via the visual-display means, and/or (g) enabling input of a musical composition based on the chart using the music staff via an interface means.

The interface means may be a computer interface device adapted for (i) alphabetical character input, (ii) color input, and/or (iii) musical note input. The computer interface device may be connected to a computer programmed to recognize the (i) alphabetical character input, (ii) color input, and/or (iii) musical note input. The visual-display means may be a computer monitor connected to the computer. The displayed music composition means may be a music staff. The displayed music staff may include (i) a clef, (ii) a set of five horizontal lines, and/or (iii) four spaces therebetween. The four spaces may each be operable to receive the input of at least a portion of the musical composition. The at least one word may be a plurality of predetermined words that form a phrase. The plurality of predetermined words may be stored on a computer-readable medium of a computer.

The method may further include the step of enabling input of the plurality of alphabetical characters to form the at least one word via the interface means. The at least one word may be a plurality of words that are inputted by a user in a sequence to form a phrase, sentence, song, story, and/or the like.

The method may further include the step of enabling playback of the musical composition via a musical instrument. The musical instrument may be a virtual instrument, for instance, an instrument displayed by a computer monitor, such as a piano keyboard. The musical instrument may be selectable via the interface means from a list of musical instruments displayed via the visual-display means.

The foregoing and other objects are intended to be illustrative of the present inventive concept and are not meant in a limiting sense. Many possible embodiments of the present inventive concept may be made and will be readily evident upon a study of the following specification and accompanying drawings comprising a part thereof. Various features and subcombinations of present inventive concept may be employed without reference to other features and subcombinations. Other objects and advantages of this present inventive concept will become apparent from the following description taken in connection with the accompanying drawings, wherein is set forth by way of illustration and example, an embodiment of this present inventive concept and various features thereof.

BRIEF DESCRIPTION OF THE DRAWINGS

A preferred embodiment of the invention, illustrative of the best mode in which the applicant has contemplated applying the principles, is set forth in the following description and is shown in the drawings.

DETAILED DESCRIPTION

Figure 1:
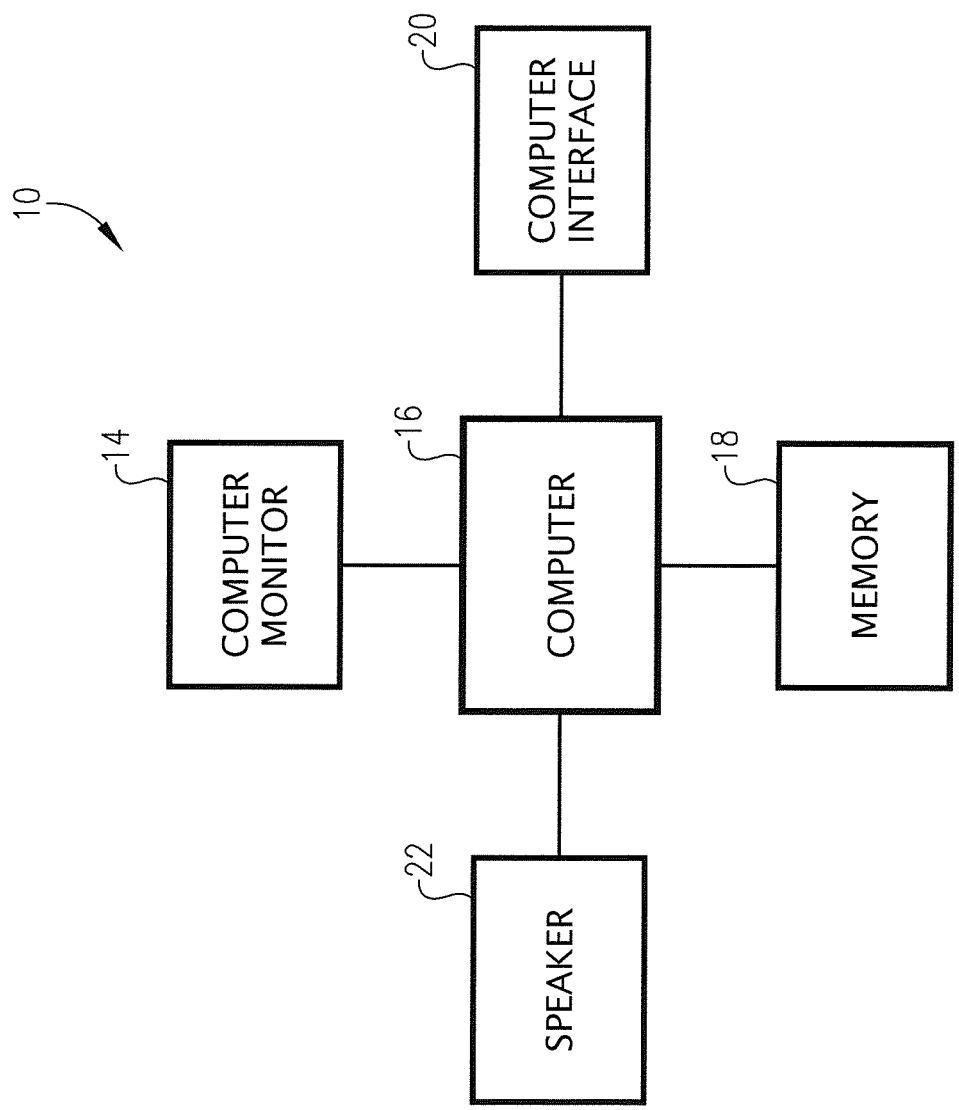
FIG. 1 is a diagram of the present inventive concept illustrating a computer connected to and in communication various computing devices.

The following detailed description of the present inventive concept references the accompanying drawings that illustrate specific embodiments in which the present inventive concept can be practiced. The embodiments are intended to describe aspects of the present inventive concept in sufficient detail to enable those skilled in the art to practice the present inventive concept. Other embodiments can be utilized and changes can be made without departing from the scope of the present inventive concept. The following detailed description is, therefore, not to be taken in a limiting sense. The scope of the present inventive concept is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, or the like described in one embodiment may also be included in other embodiments, but is not necessarily included. Thus, the present technology can include a variety of combinations and/or integrations of the embodiments described herein.

It has been discovered that teaching piano to young students is facilitated when words that are meaningful or otherwise recognizable are incorporated into piano teaching sessions, even if the young student does not yet know how to spell. Oftentimes, a student's name is the first word the student learns to read. The present inventive concept utilizes the young student's inherent and personal interests to develop the young student's ability to read music. Particularly, the present inventive concept provides a method for teaching young students to read music based on their inherent interest in objects and other stimuli in their immediate environment while simultaneously learning to read, or at least improving alphabetical character recognition and/or reading abilities.

Upon initial use of the system 10 of the present inventive concept, an inquiry 12 is displayed to query or request input from the young student or user of the present inventive concept via a visual-display means 14. In the exemplary embodiment, the visual display means 14 is a computer monitor connected to and in communication with a computer 16. The computer 16 is connected to and operable to communicate with the visual display means 14. The inquiry 12 is generated from a database or memory 18 of the computer 16 and displayed to the user via the visual display means 14. It is foreseen that the system 10 may be implemented in other mediums without deviating from the scope of the present inventive concept. For instance, the display means 14 of the system 10 may be provided via a textbook, chalkboard, dry-erase board, and/or the like without deviating from the scope of the present inventive concept.

Figure 2:
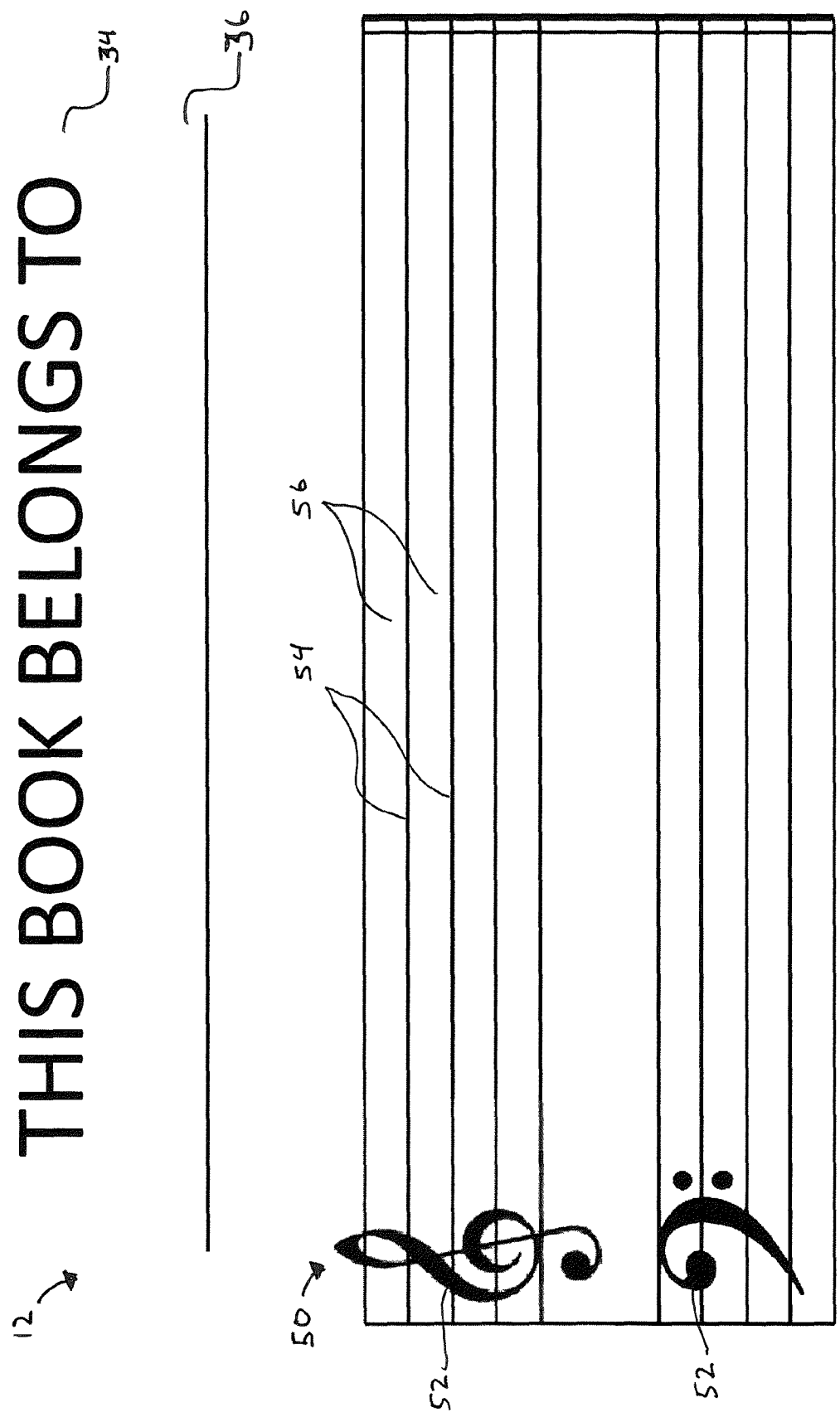
FIG. 2 is a screenshot of an inquiry generated by the system of the present inventive concept illustrated in FIG. 1.

The displayed inquiry 12 poses a question 34, "this book belongs to," and provides an input area or space 36 operable to receive an input from the user, as illustrated via a screen-shot generated by the system 10 provided by FIG. 2. The input from the user may be provided via a computer interface 20 connected to and operable to communicate with the computer 14 to allow the user to input a word that is of particularly interest to the user, for instance, using one or more alphabetical characters, one or more numerical characters and/or a combination thereof. In the exemplary embodiment, the computer interface 20 is a computer keyboard, mouse, or like device operable to receive the input from the user. It is foreseen, however, that, in the instance the system 10 is employed via a textbook and the displayed inquiry 12 is written therein, the user may simply write the user's name in the space 36 using a writing implement, such as a pencil, pen, or the like.

The displayed inquiry 12 may pose other questions related to other words and/or numbers likely to be of interest to the user that are stored in the memory 18 of the computer 14. For instance, the displayed inquiry 12 may ask the user to input any word the user would like to learn to compose musically. It is foreseen that common words may be "mommy," "daddy," and/or a pet's name and a common number may be the user's age. The present inventive concept utilizes words, having one or more alphabetical characters, and numbers, having one or more numerical characters, and/or a combination thereof, with and/or without displaying inquiries, that are easily recognizable to the user.

Also displayed with the inquiry 12 is at least one empty or blank musical staff 50. In the exemplary embodiment, the musical staff 50 includes at least one clef 52, a plurality of or five lines 54, and a plurality of or four spaces 56 between the plurality of lines 54. The manner in which the staff 50 is utilized by the system 10 will be discussed hereafter.

Figure 3:
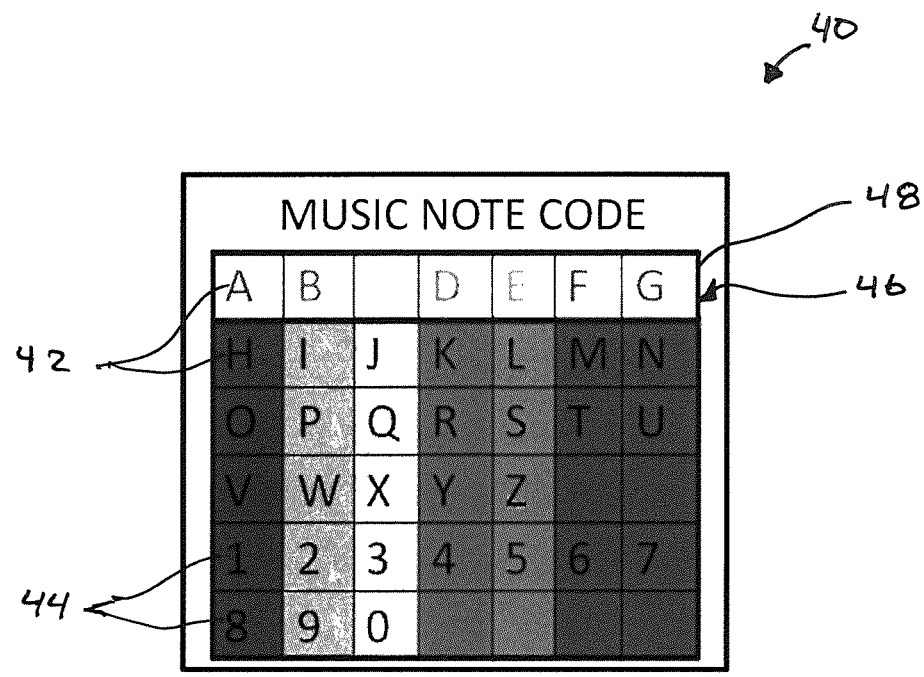
FIG. 3 is a screenshot of a music note code generated by the system of the present inventive concept illustrated in FIG. 1.

After the user responds to the displayed inquiry 12 via inputting a response in the space 36 via the computer interface 20 or the like, the present inventive concept displays a chart or music note code 40 via the visual display means 16, as illustrated by FIG. 3. The music note code 40 includes a plurality of alphabetical characters 42 and a plurality of numerical characters 44 arranged in an array of boxes 46 that extend across the visual display means 14 in both vertical and horizontal directions. In the exemplary embodiment, the array of boxes 46 is rectangular and includes seven horizontally-extending boxes and six vertically-extending boxes. It is foreseen, however, that the array of boxes 46 may be of any shape and/or include any number of boxes in one and/or both directions without deviating from the scope of the present inventive concept.

An uppermost horizontal line 48 of the music note code 40 corresponds to the seven musical notes A, B, C, D, E, F, G that are each assigned a different color. In the exemplary embodiment, the musical note A is assigned red, the musical note B is assigned orange, the musical note C is assigned yellow, the musical note D is assigned green, the musical note E is assigned light blue, the musical note F is assigned dark blue, and the musical note G is assigned purple. It is foreseen, however, that the musical notes may be assigned any color without deviating from the scope of the present inventive concept.

Each of the five vertically-extending boxes under each of the musical notes of the uppermost horizontal line 48 are assigned a color that corresponds to the assigned color of each musical note A-G of the uppermost horizontal line 48. The entire alphabet is contained within the array of boxes 46 of the music note code 40. Additionally, following the entire alphabet are numerical characters 1, 2, 3, 4, 5, 6, 7, 8, 9, 0, which are also contained within the array of boxes 46 of the music note code 40. In this manner, each alphabetical character of the entire alphabet and each of the numerical characters are assigned one of the colors assigned to the musical notes and is coded with a color code.

Using the music note code 40, the present inventive concept permits translation of the word inputted by the user as well as any other grouping of alphabetical and/or numerical characters to yield or produce a musical composition 48. In other words, each alphabetical character and/or numerical character contained in the word inputted by the user is assigned one of the seven musical notes via the music note code 40 to form the musical composition 48. In the exemplary embodiment, the computer 16 automatically processes the input received by the user by applying the input to the music note code and then translates the input received by the user by assigning one of the seven musical notes to each one of the alphabetical character and/or numerical character contained in the word inputted by the user to produce the musical composition 48. It is foreseen, however, that the user may reference the music note code 40 and manually write in a workbook or the like to produce the musical composition 48 without deviating from the scope of the present inventive concept.

Figure 4:
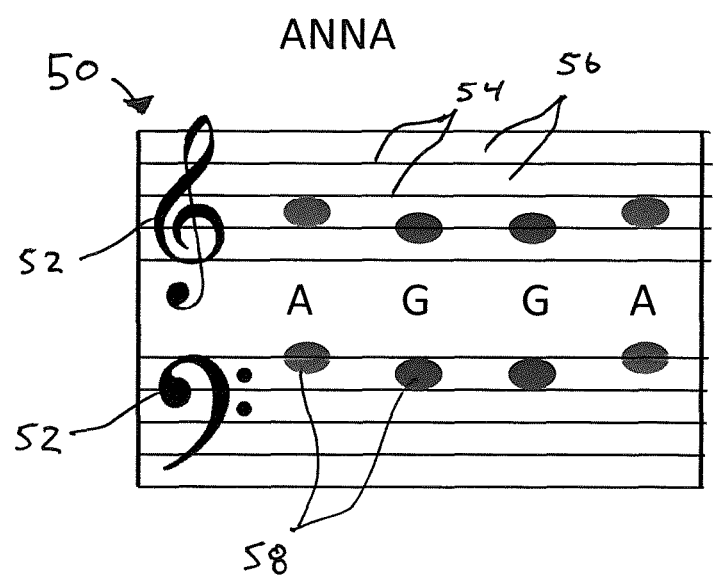
FIG. 4 is a screenshot of a musical composition generated by the system of the present inventive concept illustrated in FIG. 1.

The musical composition 48 is displayed on the staff 50, as illustrated in FIG. 4. For illustration purposes, the user has input the name "ANNA." The computer 16, upon applying the alphabetical characters to the music note code 40 has generated the musical composition 48 with notes 58 arranged on the staff 50 to be played by the user. It is foreseen that the musical composition 48 may be formed on the staff 50 with each individual input of an alphabetical and/or numerical character by the user. In other words, the musical composition 48 may be generated by the system 10 in real-time.

The system 10 may then automatically playback the musical composition 48 to the user via one or more virtual instruments, such as a piano and/or the like, and a speaker 22 connected to the computer 16. The piano or a variety of other instruments may be displayed by the visual display means 14 for selection by the user. The user may select a plurality of different instruments to simultaneously play the musical composition 48. When the user selects one or more of the instruments, the system 10 causes the musical composition 48 to be played by the selected instrument(s). Alternatively or in coordination with the automatic playback by the system 10, the user may manually play the musical composition 48 yielded by the system 10 on an instrument, such as a piano or the like. It is foreseen that colored tabs that correspond to the music note code 40 may be placed on an instrument, such as the piano keyboard, to facilitate manual playback of the musical composition 48 by the user. In this manner, the present inventive concept utilizes colors of the music note code 40 and the alignment thereof to teach and reinforce musical notes in a manner that is engaging, interactive, and enjoyable.

It is foreseen that additional functionality of the system 10 may added. For instance, chord accompaniments may be added to enhance detail of the musical composition 48 and/or interactive games, such as a spinner may be added to enhance interaction of the system 10 with the user.

Figure 5:
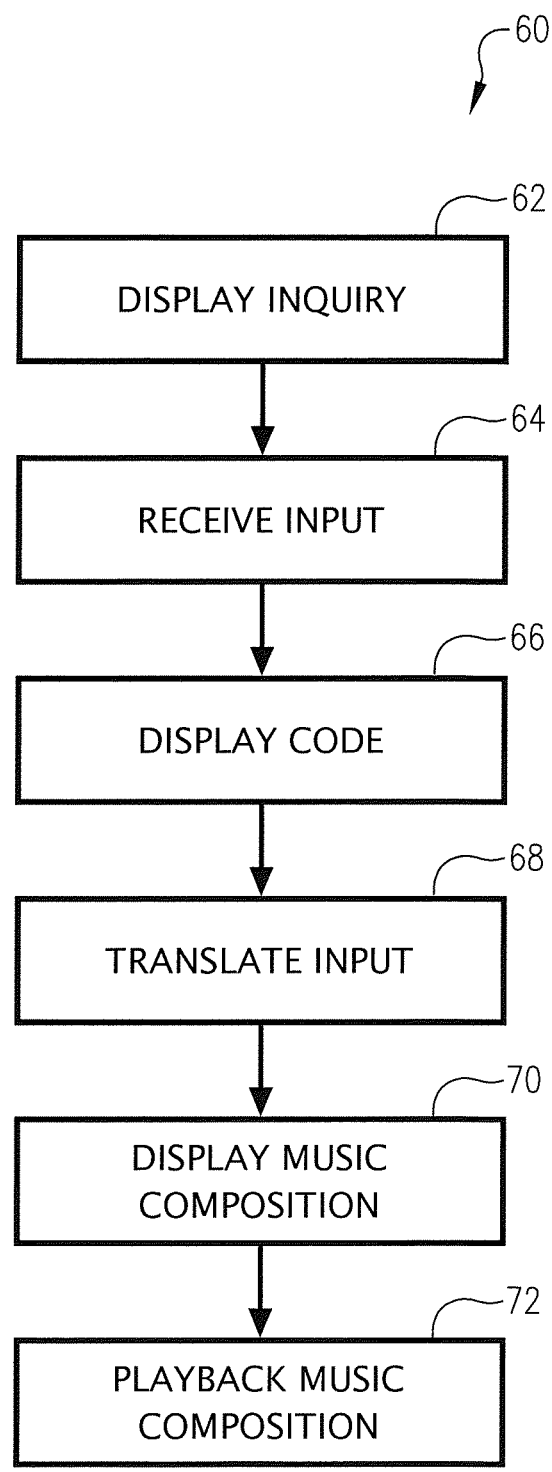
FIG. 5 is a flowchart of the system of the present inventive concept illustrated in FIG. 1.

FIG. 5 illustrates a flowchart 60 of the steps of the system 10, which may be executed with or without the computer 16. The system 10, upon commencement thereof, displays the inquiry 12 in step 62. The inquiry 12 may be displayed via the computer monitor 14, a textbook, or the like. The inquiry 12 may be generated by a processor of the computer 16 from and extracted from the memory 18 from one of a plurality of potential inquiries. Input is then received by the user in step 64. The input may be received from the computer interface 20 or be written in the textbook by the user. The music note code 40 is then displayed in step 66, via the computer monitor 14, the textbook, or the like. In step 68, the received input by the user is then translated using the music note code 40 by the processor of the computer 16 to yield a result. The result, which is the musical composition 48 is then displayed by the computer monitor 14, the textbook, or the like in step 70. In step 72, the musical composition 48 may be played back automatically by the computer 16, for instance, using the speaker 22, and/or manually played back by the user, for instance, using an instrument such as a piano.

Accordingly, the present inventive concept provides an educational method that utilizes a plurality of apparatuses to simultaneously teach reading and composing musical notes and alphabetical characters, is versatile for use by a wide variety of students of varying degrees of education and ability, and is efficient, easy, and economical to use.

Various embodiments of the present generally inventive concept can be embodied as computer readable codes (e.g., computer instructions) on a memory or non-transitory computer readable recording medium for causing a computer processor to perform (e.g., functions of the present general inventive concept). The computer readable recording medium may include any data storage device suitable to store data that can be read by a computer system. A non-exhaustive list of possible examples of computer readable recording mediums include read-only memory (ROM), random-access memory (RAM), CD-ROMS, magnetic tapes, floppy disks, optical storage devices, and carrier waves, such as data transmission via the internet. The computer readable recording medium may also be distributed over network-coupled computer systems so that the computer readable code is stored and executed in a distribution fashion. Various embodiments of the present general inventive concept may also be embodied in hardware, software or in a combination of hardware and software. For example, the user interface, controller and/or functions thereof may be embodied in software, in hardware or in a combination thereof. In various embodiments, the controller and/or functions thereof may be embodied as computer readable codes on a computer readable recording medium to perform tasks such as file and/or data processing operations, such as data processing and display operations.

Having now described the features, discoveries and principles of the general inventive concept, the manner in which the general inventive concept is constructed and used, the characteristics of the construction, and advantageous, new and useful results obtained; the new and useful structures, devices, tools, elements, arrangements, parts and combinations, are set forth in the appended claims.

It is also to be understood that the following claims are intended to cover all of the generic and specific features of the general inventive concept herein described, and all statements of the scope of the general inventive concept which, as a matter of language, might be said to fall therebetween.

What is claimed is:

1. A method for composing a musical composition, the method comprising the steps of:
    (a) providing a computer interface device adapted for alphabetical character input or numerical character input, and connecting said device to a computer programmed to recognize the alphabetical character input or numerical character input, and output a musical composition based on the alphabetical character input or numerical character input;
    (b) displaying at least one word having a plurality of alphabetical characters via a monitor connected to the computer;
    (c) displaying a plurality of colors via the monitor connected to the computer;
    (d) displaying a plurality of musical notes via the monitor connected to the computer;
    (e) enabling assignment of each one of the plurality of colors to each one of the plurality of alphabetical characters via one of the computer interface device and automatically via the computer;
    (f) enabling assignment of each one of the plurality of musical notes to each one of the plurality of colors to form the musical composition via the computer interface device; and
    (g) displaying the musical composition to enable playback thereof.

2. The method according to claim 1, wherein the displayed music composition means includes a music staff.

3. The method according to claim 2, wherein the displayed music staff includes (i) a clef, (ii) a set of five horizontal lines, and (iii) four spaces therebetween, the four spaces each operable to receive the input of at least a portion of the musical composition.

4. The method according to claim 1, wherein the at least one word is a plurality of predetermined words that form a phrase, the plurality of predetermined words stored in a memory of the computer.

5. The method according to claim 1, further comprising the step of:

enabling input of the plurality of alphabetical characters to form the at least one word via the interface means, 6. A method for composing a musical composition, the method comprising the steps of.
   (a) providing a computer interface device adapted for alphabetical character input or numerical character input, and connecting said device to a computer programmed to (i) recognize the alphabetical character input or numerical character input, and (ii) output a musical composition based on the alphabetical character input or numerical character input;
   (b) displaying a plurality of words via a monitor connected to the computer, each of the plurality of words having a plurality of alphabetical characters;
   (c) displaying a plurality of colors via the monitor connected to the computer;
   (d) displaying a plurality of musical notes via the monitor connected to the computer;
   (e) enabling selection of at least one of the plurality of words via the computer interface device;
   (f) assigning each one of the plurality of colors to each one of the plurality of alphabetical characters via the computer;
   (g) assigning each one of the plurality of musical notes to each one of the plurality of colors to form the musical composition via the computer; and
   (h) playing back the musical composition via a speaker connected to the computer.

7. The method of claim 6, wherein the plurality of words are predetermined words stored in a database of the computer.

8. The method of claim 7, further comprising the steps of:
   enabling input of a name of the user via the computer interface device; and
   storing the name of the user in the database of the computer.

9. The method of claim 6, further comprising the steps of:
   displaying an interactive selection device;
   allowing a user to activate the interactive selection device; and
   displaying a result of the activated interactive selection device,
   wherein the result is a song to be played by the user.

10. A method for composing a musical composition, the method comprising the steps of:
    (a) displaying at least one word having a plurality of alphabetical characters via a visual-display means;
    (b) displaying a plurality of colors via the visual-display means;
    (c) displaying a plurality of musical notes via the visual-display means;
    (d) assigning each one of the plurality of alphabetical characters to (i) each one of the plurality of colors, and (i) each of the plurality of musical notes;
    (e) displaying the assignments on a chart via the visual-display means;
    (f) displaying a music composition means via the visual-display means; and
    (g) enabling input of a musical composition based on the chart using a music staff via an interface means.

11. The method according to claim 10, wherein
    the interface means is a computer interface device adapted for (i) alphabetical character input, (ii) color input, and (iii) musical note input, the computer interface device connected to a computer programmed to recognize the (i) alphabetical character input, and (ii) color input, and (iii) musical note input, and
    the visual-display means is a computer monitor connected to the computer.

12. The method according to claim 10, wherein the music staff includes (i) a clef, (ii) a set of five horizontal lines, and (iii) four spaces therebetween, the four spaces each operable to receive the input of at least a portion of the musical composition.

13. The method according to claim 10, wherein the at least one word is a plurality of predetermined words that form a phrase, the plurality of predetermined words stored on a computer-readable medium of a computer.

14. The method according to claim 10, further comprising the step of:
    enabling input of the plurality of alphabetical characters to form the at least one word via the interface means.

15. The method according to claim 14, wherein at least one word is a plurality of words that are inputted in a sequence to form a phrase.

16. The method according to claim 10, further comprising the step of:
    enabling payback of the musical composition via a musical instrument.

* * * * *